(12) United States Patent
Latwesen et al.

(10) Patent No.: US 6,525,284 B2
(45) Date of Patent: Feb. 25, 2003

(54) SWITCHING DEVICE, IN PARTICULAR FOR AN IGNITION-STARTER SWITCH IN A MOTOR VEHICLE

(75) Inventors: Frank Latwesen, Erlangen (DE); Hermann Von Ende, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/992,291

(22) Filed: Nov. 16, 2001

(65) Prior Publication Data

US 2002/0144883 A1 Oct. 10, 2002

(30) Foreign Application Priority Data

Nov. 16, 2000 (DE) .......................... 100 56 860

(51) Int. Cl.⁷ ................................. H01H 3/02
(52) U.S. Cl. ....................... 200/520; 200/529
(58) Field of Search ................. 200/520, 529, 200/533, 557, 558, 573, 577, 335, 339, 341, 342, 345, 43.03, 43.04, 43.07, 43.08, 537

(56) References Cited

U.S. PATENT DOCUMENTS 5,841,363 A    11/1998   Jakob et al.

FOREIGN PATENT DOCUMENTS

| DE | 2102206      | * | 1/1983 |
| EP | 269584       | * | 1/1988 |
| EP | 0 720 545 B1 |   | 7/1996 |
| GB | 3726774      | * | 8/1988 |

* cited by examiner

Primary Examiner—Lincoln Donovan
Assistant Examiner—Lisa Klaus
(74) Attorney, Agent, or Firm—Laurence A. Greenberg; Werner H. Stemer; Ralph E. Locher

(57) ABSTRACT

The switching device has an actuation surface and a force transmission element disposed in a holding device. The holding device has a mechanical guide that defines a motion of the force transmission element. If pressure is exerted on the actuation surface, the force transmission element at least partially performs a rotary motion in dependence on an actuation path traveled by the actuation surface. During the process, force transmission to the switching element is deflected and guided away from the switching element as soon as the force transmission element starts to at least partially perform the rotary motion.

11 Claims, 5 Drawing Sheets

SWITCHING DEVICE, IN PARTICULAR FOR AN IGNITION-STARTER SWITCH IN A MOTOR VEHICLE

BACKGROUND OF THE INVENTION

Field of the Invention

The invention relates to a switching device, in particular for an ignition-starter switch in a motor vehicle.

In a prior art device (see European patent EP 0 720 545 B1 and U.S. Pat. No. 5,841,363), an electronic ignition key is inserted into an ignition-starter lock. After a coded operating signal has been checked and authorization has been established, initial unlocking of the motion of the ignition key is enabled. From an initial position, a rotary and/or translational motion can then be imparted to the ignition key. The motion of the ignition key affects the switching elements situated in the ignition-starter lock.

In the prior device, the authorization check of the ignition key inserted into the ignition lock and the structure of the device are complex. Moreover, damage can occur both to the ignition key and to the ignition-starter lock if excessive mechanical force is exerted on the ignition key.

SUMMARY OF THE INVENTION

It is accordingly an object of the invention to provide a switching device, in particular an ignition-starter switch in a motor vehicle, which overcomes the above-mentioned disadvantages of the heretofore-known devices and methods of this general type and which reduces the potential of damage and/or functional failure of a switching element.

With the foregoing and other objects in view there is provided, in accordance with the invention, a switching device, in particular an ignition-starter switch for a motor vehicle, which comprises:

an actuation surface disposed to perform a translational movement upon actuation;

a force transmission element operatively connected with the actuation surface;

a switching element operatively connected with the force transmission element, the switching element being switched by the force transmission element upon an actuation of the actuation surface, whereby switching functions are initiated or performed;

a holding device wherein the force transmission element is disposed, the holding device having a mechanical guide for the force transmission element, the mechanical guide being configured such that a force transmission to the switching element via the force transmission element is at least partially deflected when a movement of the force transmission element changes from a first motion to a second motion in dependence on an actuation path traveled.

In other words, the switching device has a force transmission element, which is in mechanical effective connection, i.e., operatively connected, with a switching element. The force transmission element is arranged in a holding device. If pressure is exerted on an actuation surface, which is in mechanical effective connection with the force transmission element, a force that acts on the actuation surface is it transmitted to the switching element via the force transmission element.

According to the invention, the holding device has a mechanical guide, which predetermines a motion of the force transmission element as a function of an actuation path traveled by the actuation surface. The mechanical guide is configured in such a way that a force transmitted via the force transmission element to the switching element is at least partially deflected as a function of the actuation path traveled by the actuation surface. The deflection of the force away from the switching element takes place as soon as the motion of the force transmission element changes from a first sequence of motion to a second sequence of motion.

This makes it possible to avoid mechanical overloading of the switching element and to achieve a longer functional life and lower susceptibility to defects for the switch.

In accordance with an added feature of the invention, the mechanical guide is geometrically configured to ensure that the first motion is translational and the second motion is at least partially rotational, or vice versa. That is, the geometrical configuration of the mechanical guide can be embodied in such a way that the first sequence of motion of the force transmission element is translational and the second sequence of motion of the force transmission element is at least partially rotary. The order wherein the sequences of motion occur can also be reversed, however.

In accordance with an additional feature of the invention, the actuation surface includes at least one connecting element.

In accordance with another feature of the invention, the force transmission element includes a plurality of connecting elements for switching a plurality of switches simultaneously or in succession. That is, provision can be made for force to be transmitted simultaneously or in succession via a force transmission element to a plurality of switches when pressure is exerted on the operating element. This ensures that the actuation surface and the components of the device can be made relatively small and that, as a result, the switching device can have a space-saving construction.

In accordance with a further feature of the invention, the force transmission element is a mechanical rocker lever.

In accordance with again an added feature of the invention, a plurality of force transmission elements and a plurality of holding devices are provided.

In accordance with again an additional feature of the invention, at least one of the switching elements includes a device for indicating a switching of the switching element to be detected haptically.

It is thereby possible to ensure that, when pressing on the actuation surface, the user detects when a switching element switches and an associated switching function is initiated or performed and that the user then reduces the pressure on the actuation surface.

In accordance with again a further feature of the invention, a return device is provided for returning the force transmission element to an initial position when the actuation surface is no longer being pressed. In accordance with a concomitant feature of the invention, the return device is a spring having one end connected to the actuation surface and another end connected to the force transmission element.

Other features which are considered as characteristic for the invention are set forth in the appended claims.

Although the invention is illustrated and described herein as embodied in switching device, in particular for an ignition starter switch in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
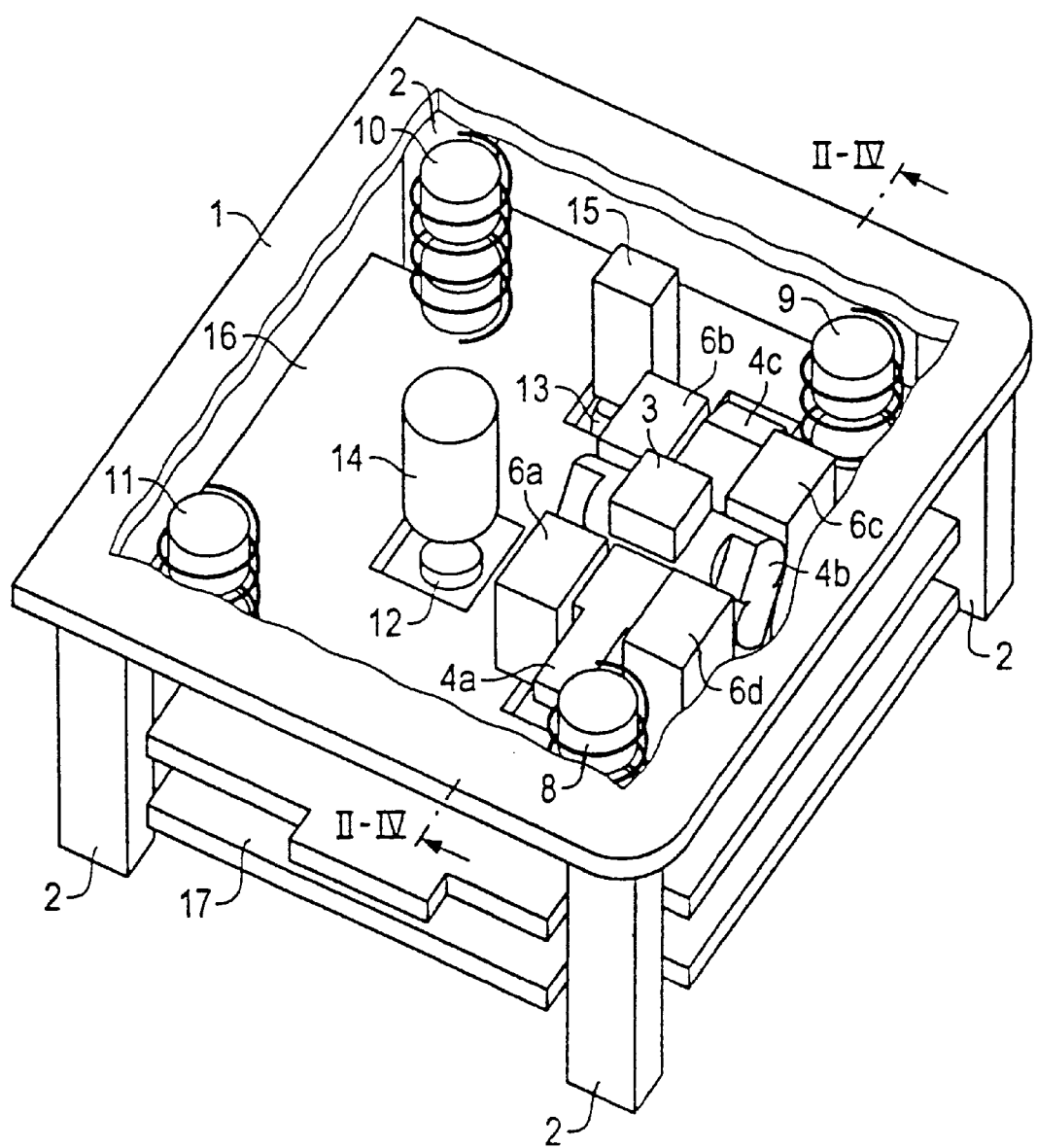
FIG. 1 is a partly broken-away, perspective view of a switching device according to the invention.

Referring now to the figures of the drawing in detail and first, particularly, to FIG. 1 thereof, there is shown A switching device according to the invention has an actuation surface 1 (FIG. 1), only part of which is illustrated, on which a user presses and thereby manually actuates the actuation surface 1. The actuation surface 1 can be connected mechanically to guides 2. A connecting element 3 is mounted on the underside of the face of the actuation surface 1.

Figure 2:
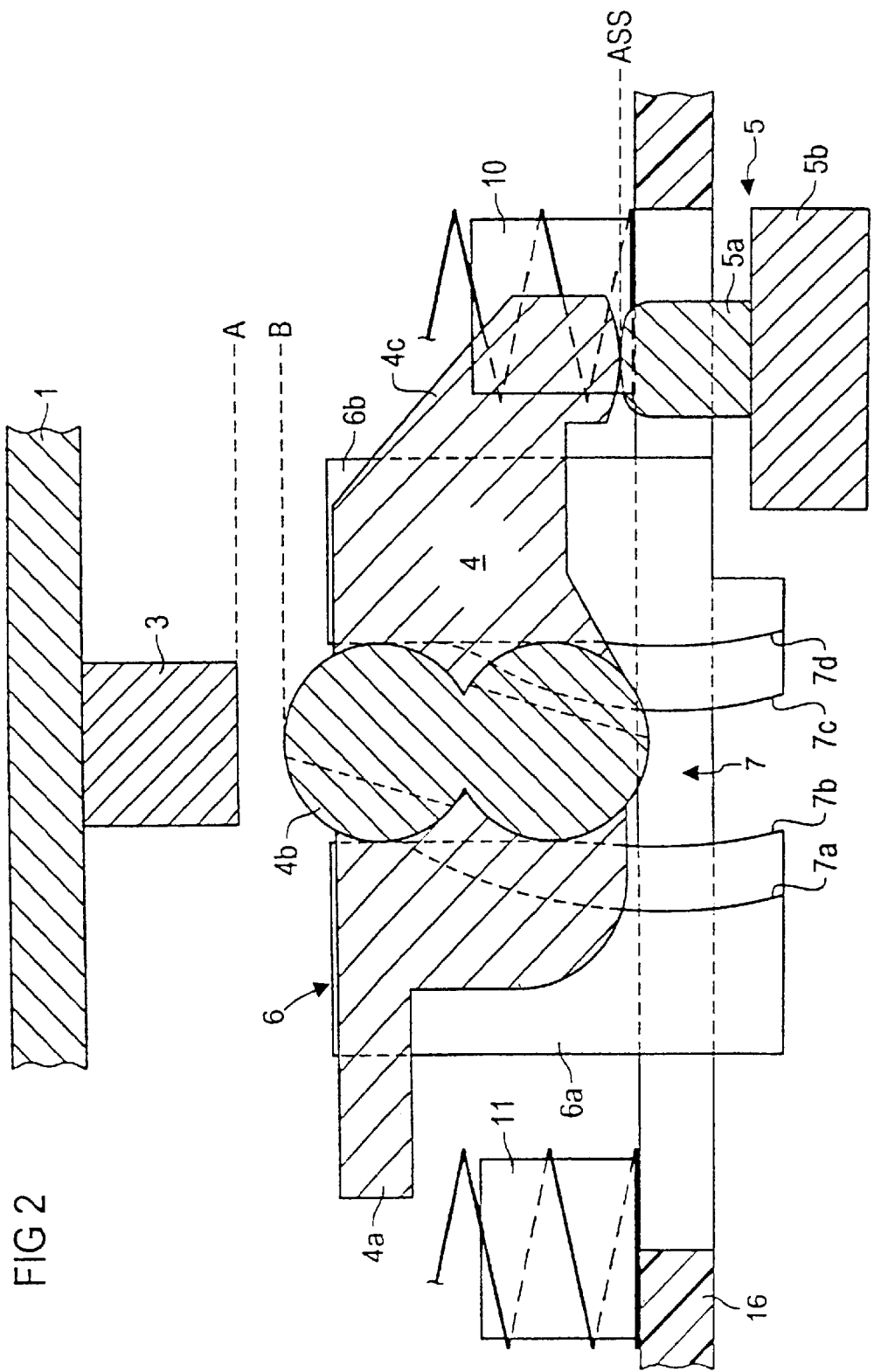
FIG. 2 is a schematic and sectional view through the switching device shown in FIG. 1 along the line II—II, corresponding to an initial state.
Figure 3:
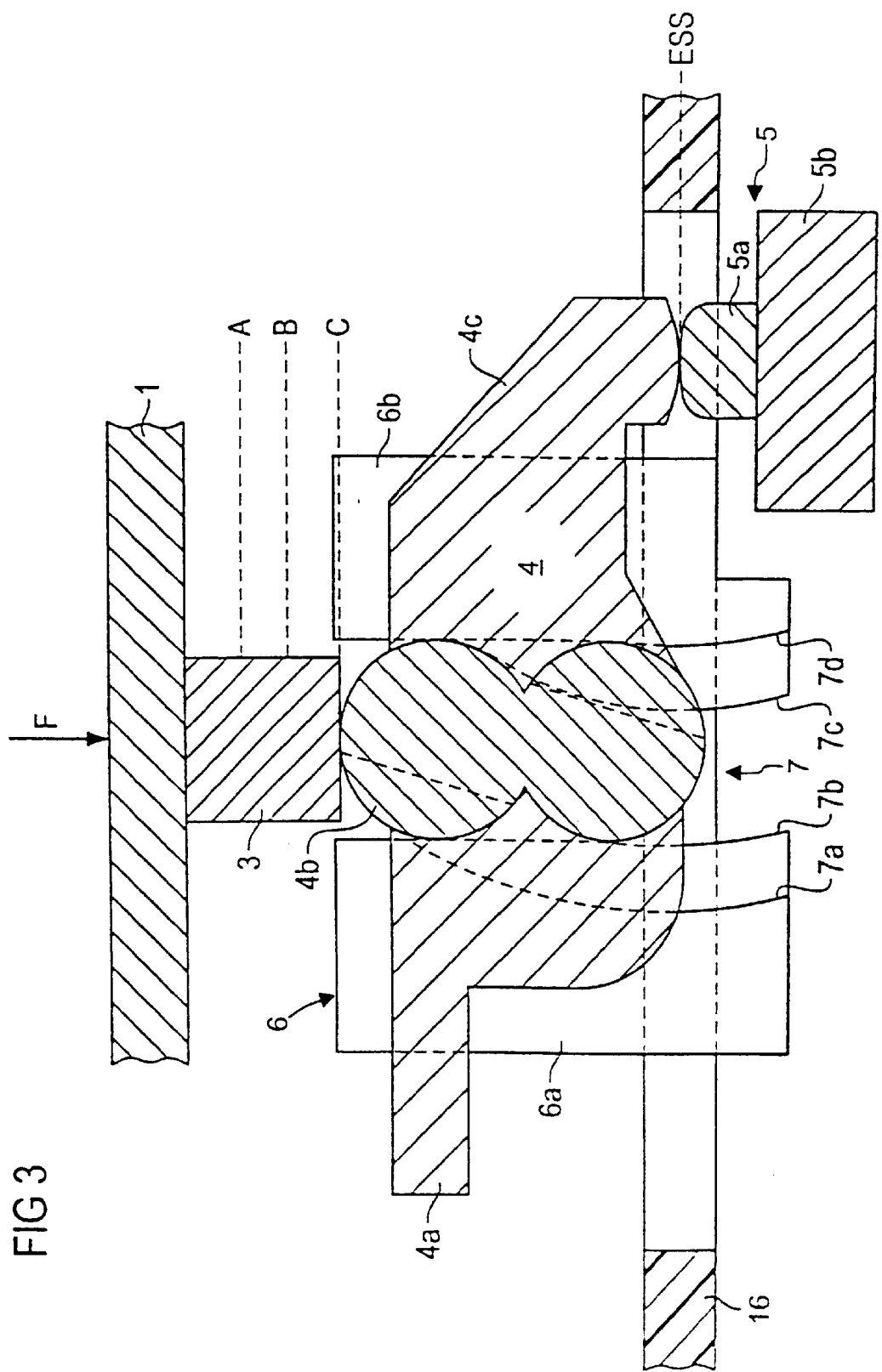
FIG. 3 is a similar section through the switching device of FIG. 1 taken along the line III—III, corresponding to a first state of actuation.
Figure 4:
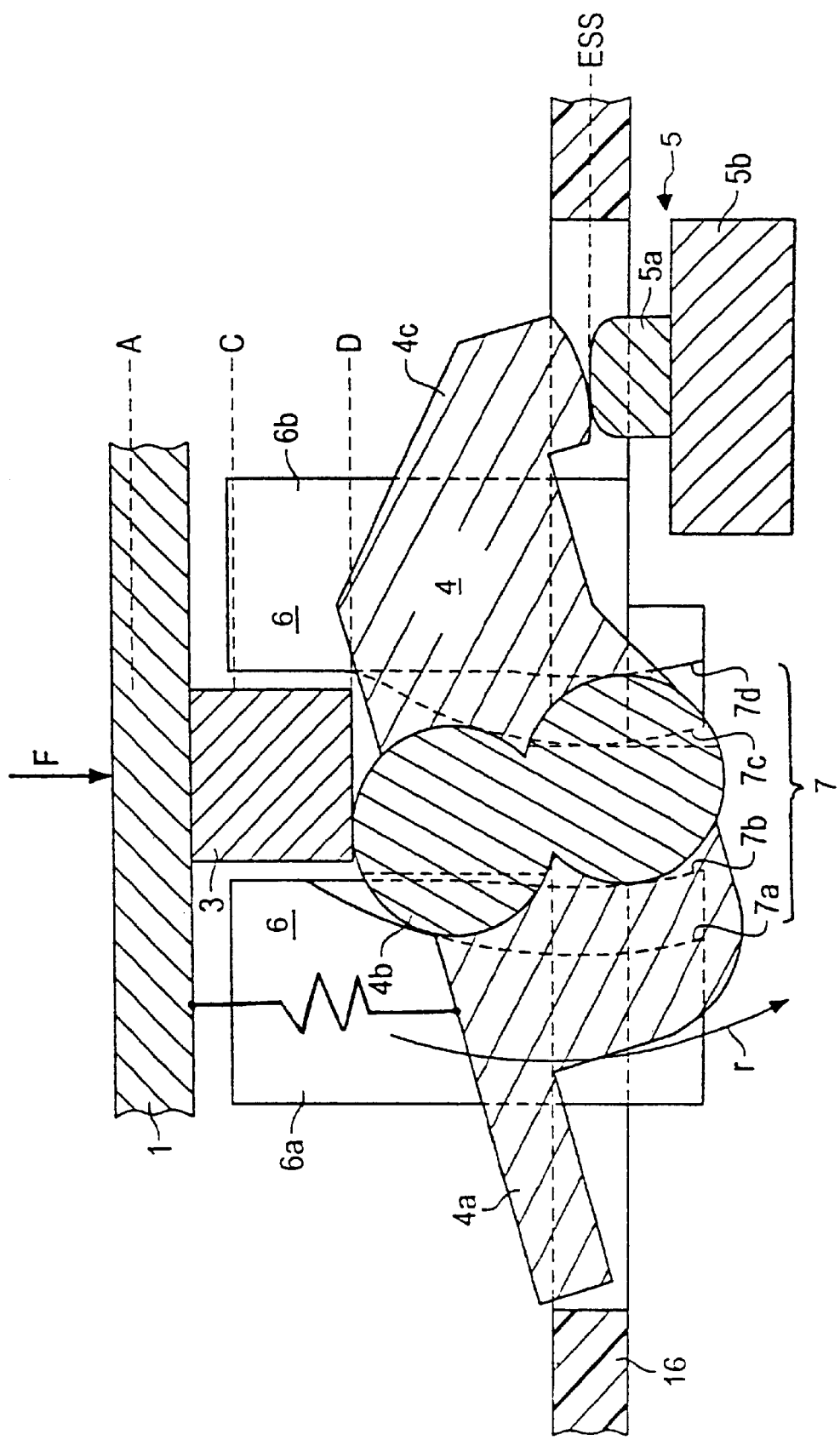
FIG. 4 is a similar section through the switching device of FIG. 1 taken along the line IV—IV, corresponding to a final state.

Pressing on the actuation surface 1 with a force F causes the connecting element 3 to press on a switching member 5a of a switching element 5 via a force transmission element 4 (cf. FIGS. 2–4). The force transmission element 4 is made up of the component elements 4a, 4b, and 4c, which are firmly connected to one another.

The switching element 5 has the switching member 5a and a housing 5b. Pressing on and force transmission to the switching member 5a will be referred to below as pressing on or force transmission to the switching element 5.

When the actuation surface 1 is pressed down, contact with the force transmission element 4 is established by means of the connecting element 3. The force transmission element 4 is arranged in a holding device 6. In the exemplary embodiment, the holding device 6 is embodied in such a way that the force transmission element 4 is held in its position by means of four holding elements 6a, 6b, 6c, and 6d. The holding elements 6a, 6b, 6c, and 6d will be referred to below as holding device 6.

The holding device 6 has guide surfaces 7a, 7b, 7c, and 7d (cf. FIGS. 2–4). The guide surfaces 7a, 7b, 7c, and 7d will be referred to below as mechanical guide 7.

The mechanical guide 7 predetermines a sequence of motion of the force transmission element 4 when the actuation surface 1 is pressed down since component element 4b of the force transmission element 4 slides along guide surfaces 7a–d. The sequence of motion depends on an actuation path traveled by the actuation surface 1 and the guides 2. While the actuation surface 1 is being pressed down, a force is produced on the actuation surface 1. The force is transmitted to the switching element 5 via the connecting element 3 and the force transmission element 4. A mechanical effective connection has thus been established between the switching element 5 and the force transmission element 4.

Depending on an actuation path traveled by the actuation surface 1 and the guides 2, the mechanical guide 7 converts the exclusively translational motion of the force transmission element 4 into a, at least partially, rotary motion.

Although components 8, 9, 10, 11, 12, 13, 14, and 15 are shown in FIG. 1, they are not absolutely essential for the first exemplary embodiment.

The operation of the switching device is illustrated in greater detail in FIGS. 2, 3, and 4. Starting from an initial position A (FIG. 2), the connecting element 3 is at a distance A–B, which can be 1 mm for example, from a component element 4b of the force transmission element 4. Pressing on or force transmission to the component element 4b will be referred to below as pressing on or force transmission to the force transmission element 4.

In this initial position A, the actuation surface 1 has not yet been actuated. The state illustrated in FIG. 1 is referred to as the initial state.

The force transmission element 4 is arranged movably in the holding device 6. In this arrangement, component element 4b is guided by virtue of the geometrical configuration of the mechanical guide 7. Component element 4b and the holding device 6, which has the mechanical guide 7, are arranged in such a way that component element 4b can move with an accurate fit in the mechanical guide 7. The force transmission element 4 is furthermore in mechanical effective connection with the switching element 5.

If, starting from A, the actuation surface 1 is pressed down with the force F, by means of a finger for example, the connecting element 3 comes into contact with the force transmission element 4 after traveling the actuation path A–B (FIG. 3). The state illustrated in FIG. 3 is referred to as the first state of actuation.

If the actuation surface 1 is now pressed down beyond the actuation path A–B already traveled, the force transmission element 4 is consequently also pressed down. During this process, the force transmission element 4 is pressed down in translation in the same direction as the connecting element 3. The translational motion of the force transmission element 4 is predetermined here by the mechanical guide 7 of the holding device 6.

The force produced during the action of the connecting element 3 on the force transmission element 4 is transmitted to the switching element 5.

On the actuation path of the actuation surface 1 between B and C, which can be 1 mm for example, a counterforce defined by a device belonging to the switching element 5 and acting counter to the actuation force builds up and dissipates again. The device can be a spring in the switching element 5, for example.

The counterforce to the downward pressure on the switching element 5 thus reaches a maximum between B and C. This transitional position, which does not have a specific reference, from which the counterforce, characteristic of the switching element 5, to the actuation force F decreases, is referred to as the "click point". This "click point" can be detected haptically (by sense of touch).

Those skill in the pertinent art are familiar with the ways wherein a counterforce of this kind can build up—linearly etc.—and there is therefore no need to explain this further.

In position C of the actuation path of the actuation surface 1, the switching element 5 reaches the end position ESS of its individual total actuation path ASS-ESS. The switching element 5 must not be pressed down beyond this end position ESS since otherwise the switching element 5 could be damaged or destroyed.

If the actuation surface 1 is pressed down beyond point C of the actuation path (FIG. 4), the exclusively translational motion of the force transmission element 4 is converted into an at least partially rotary motion by the mechanical guide 7. The geometrical configuration of the mechanical guide 7 is such that a center of rotation of the force transmission element 4 is vertically below the connecting element 3. In the exemplary embodiment, this ensures that the force transmission element 4 performs a rotary motion—illustrated by the arrow r in FIG. 4—about its center of rotation. In the exemplary embodiment, a translational motion in the direction of the force F is superimposed on this rotary motion.

Pressing the actuation surface 1 down farther on the actuation path between C and the end position D—the force transmission element 4 is illustrated in the end position D and hence in a final state in the figure—where the end position D of the total actuation path A–D can come after 3.5 mm for example, produces a force on the force transmission element 4.

In this region of the actuation path of the actuation surface 1 between C and D, the force transmission element 4 at least partially performs a rotary motion. The force F produced by the downward pressure on the actuation surface 1 is thus at least partially deflected, and the force F is thus at least partially diverted away from the switching element 5. The force that has to be extended to actuate the actuation surface 1 from position C to position D is therefore at least partially deflected and not transmitted to the switching element 5. During the pressing down of the actuation surface 1 in the region between C and D of the actuation path, the switching element 5 thus remains approximately fixed in the end position ESS.

The end position ESS of the total actuation path of the switching element 5 corresponds to the intermediate position C of the actuation path of the actuation surface 1.

The deflection of the force thus prevents the switching element 5 from being pressed down beyond its end position ESS if the actuation surface 1 is pressed down on the actuation path between C and D.

Mechanical overloading of the switching element 5 can thus be prevented at least partially, even if the switching element 5 has reached the end position ESS of its total actuation path and the actuation surface is pressed down beyond position D.

It is thus possible to ensure that the switching element 5 will last a relatively long time and function relatively reliably.

In this context, the term "total actuation path of the switching element 5" denotes the path traveled from the initial position ASS of the switching element 5 to an end position ESS of the switching element 5 when the switching element 5 is pressed down. In the exemplary embodiment, the total actuation path of the switching element 5 is about 1 mm.

In this context, the term "total actuation path of the operating element 1" denotes the path traveled from the initial position A of the connecting element 3 to the end position E of the connecting element 3 when the actuation surface 1 is pressed down. In the exemplary embodiment, the total actuation path of the actuation surface 1 is therefore identical with the total actuation path of the connecting element 3.

The total actuation path A–D of the actuation surface 1 can be adjusted by way of the geometrical configuration of the spring-tappet combination 8, 9, 10 and 11 illustrated in FIG. 1 and/or by way of the geometrical configuration of the guides 2.

Figure 5:
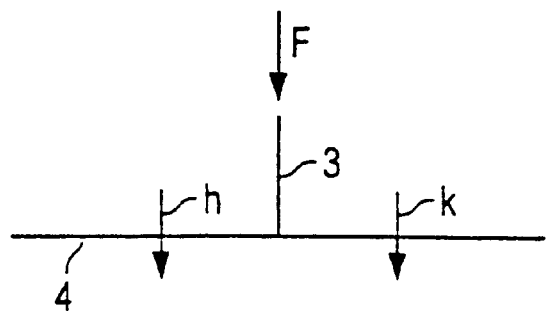
FIG. 5 is a schematic graphical representation of an exclusively translational movement of the force transmission element along an actuation path.

This sequence of motion of the force transmission element 4 along the actuation path from A to C is illustrated in simplified form in FIG. 5. The arrows h and k indicate the translational motion in the direction of the force F, i.e. the motion up to the point when the connecting element 3 is resting on component element 4b of the force transmission element 4.

Figure 6A:
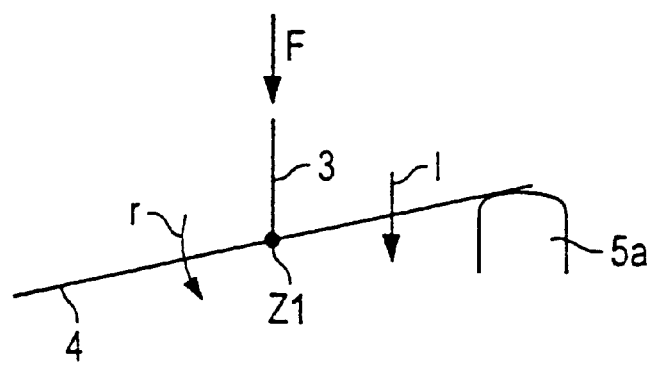
FIGS. 6A and 6B are schematic graphical representations of at least partially rotary movements of the force transmission element as a function of a selected center of rotation.

The sequence of motion of the force transmission element 4 along the actuation path from C to D is illustrated in simplified form in FIG. 6A. Here, Z1 denotes the center of rotation of the force transmission element 4, which is vertically below the contact element 3. The force transmission element 4 thus performs a movement, which is made up of a translational component, indicated by the arrow l, and a rotary component, indicated by the arrow r. This ensures that the force transmission element 4 remains fixed in its position at the point of contact with the switching member 5a.

A point of contact on a contact surface between component element 4c of the force transmission element 4 and the switching member 5a can also be chosen as the center of rotation of the force transmission element 4. The force transmission element 4 then performs an exclusively translational motion along the actuation path from B to C. On the actuation path from C to D, the force transmission element 4 then performs an exclusively rotary motion—represented by the arrow r.

Figure 6B:
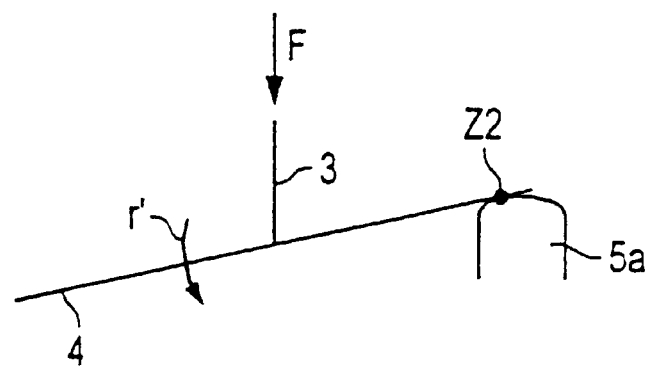

In FIG. 6B, this exclusively rotary motion of the force transmission element 4 along the actuation path from C to D is represented by the arrow r'. The center of rotation here is indicated by Z2.

It is irrelevant to the invention which particular actuation paths are set or chosen for the corresponding path sections. It is important, however, that the exclusively translational motion of the force transmission element 4 should be converted to the at least partially rotary motion no later than when the end position ESS of the switching element 5 is reached when pressing down.

Conversion of the translational motion of the force transmission element 4 to the at least partially rotary motion can also take place even before the switching element 5 has reached the end position ESS of its total actuation path. This makes it possible to achieve a tolerance range, by means of which it is possible to provide further security against damage or destruction of the switching element 5.

The force transmission element 4 and/or the mechanical guide 7 can also be configured in such a way that the switching element 5 is returned at least partially to its initial position ASS as soon as the motion of the force transmission element 4 is at least partially rotary.

The design of the spring-tappet combinations 8, 9, 10, and 11 and of the guides 2 is unimportant for the invention. The guides 2 are therefore not even shown in FIGS. 2–4, and only the tappets of the spring-tappet combinations 8 and 9 are shown in FIG. 2.

An operative connection, or a mechanical effective connection between elements of the device is intended to mean the direct mechanical contact between the elements, by means of which a force is transmitted or a mechanical motion is guided. In FIG. 3, for example, the force transmission element 4 is in mechanical effective connection with the actuation surface 1 and the switching element 5.

However, the term "operatively connected" (again essentially synonymous with "a mechanical effective connection") is also intended to refer to the state illustrated by way of example in FIG. 2, wherein the actuation surface 1 and the connecting element 3 are at a distance from the force transmission element 4. In FIG. 2, there is therefore a mechanical effective connection both between the actuation surface 1 and the force transmission element 4 and between the force transmission element 4 and the switching element 5.

As soon as the motion of the force transmission element 4 has been converted to the at least partially rotary form, it is no longer possible for the force transmission element 4 to perform an independent return motion when the actuation surface 1 is no longer being pressed down. A return device 18, which returns the force transmission element 4 to its initial position, can therefore be present.

The return device 18 is indicated here as a spring 18 (only diagrammatically illustrated) that is connected to the actuation surface 1 at one end and to the force transmission element 4 at the other end. In the initial position and during the exclusively translational motion of the force transmission element 4, the spring is in a relaxed state. While the force transmission element 4 is performing the at least partially rotary motion, the spring is stressed. When the actuation surface 1 is no longer being pressed down, the actuation surface 1 is returned to the initial position by means of the spring-tappet combinations 8, 9, 10, and 11.

As the spring 18 also returns to its relaxed state, the force transmission element 4 is thus also moved into its initial position.

In another exemplary embodiment, wherein the elements of the switching device are provided with identical reference numerals, provision is made for additional switches 12 and 13 (FIG. 1) to be actuated as a function of the actuation path traveled by the operating element 1. If the actuation surface 1 is pressed down, starting from the initial position A (FIG. 2), switching element 12 is pressed down and switched by a further connecting element 14 in the case of an actuation path that is less than the actuation path A–B and can be 0.5 mm, for example. This triggers or initiates one switching function. Provision can likewise be made in this case for the initiation or triggering of the switching function by the switching of switching element 12 to be haptically detectable by the finger on the actuation surface 1.

In the case of an actuation path traveled between A–C and A–D (FIG. 4) of the actuation surface 1, which can be 3 mm for example, switching element 13 is pressed down and switched by another connecting element 15 (FIG. 1).

The switching element 13 is configured in such a way that the initiation or execution of a switching function correlated with switching element 13 is haptically detectable by the finger on the operating element 1.

The components of the switching device or at least some of the components are arranged on a printed circuit board 16 (FIGS. 1–4) or a printed circuit board 17 (FIG. 1).

The actuation surface 1 can also be embodied in such a way that there are no connecting elements 3, 14, and 15. The actuation surface 1 can be embodied as a button or a rocker, for example.

The force transmission element 4 can be embodied as a rocker lever, for example.

The connecting elements 3, 14, and 15 can be configured as elastically deformable or rigid plungers. By making one or more connecting elements 3, 14, and 15 elastically deformable, it is possible to ensure that the force that is transmitted to the force transmission element 4 and/or the switching elements 5, 12, 13 is damped. Additional security against damage and destruction of the switching device is thereby possible.

In another exemplary embodiment, the switching device can be configured in such a way that there is only one force transmission element 4, by means of which a plurality of switching elements 5, 12, 13 of the same type or of different types can be switched simultaneously or in succession when the actuation surface 1 is pressed down.

However, it is also possible for there to be a plurality of force transmission elements 4, by means of which one or more switching elements 5, 12, 13 are switched in each case.

The mechanical guide 7 can also be configured geometrically in such a way that one or more force transmission elements 5 initially perform an at least partially rotary motion, which is then converted to an exclusively translational motion as a function of the actuation path traveled by the actuation surface 1.

It is also possible to configure the mechanical guide 7 in such a way that the motion of the force transmission element or elements 4 on the total actuation path A–D of the actuation surface 1 is converted several times from an exclusively translational motion into an at least partially rotary motion and vice versa.

It is thereby possible to ensure that a larger number of switching elements 5 and switching functions correlated with them can be initiated or performed during a single depression of the actuation surface 1 without switching elements 5 being mechanically overloaded.

Provision can also be made for there already to be mechanical contact between the connecting element 3 and the force transmission element 4 in the initial state A. It is also possible in this context for there to be no mechanical contact between the force transmission element 4 and the switching element 5 in the initial position A. Only by pressing down the actuation surface 1 and hence also the force transmission element 4 is mechanical contact produced between the force transmission element 4 and the switching element 5 as a function of the actuation path traveled by the actuation surface 1.

Provision can also be made for there to be a combined start/stop button, with corresponding switching elements being switched by pressing down the start button. Pressing down the stop button then switches switching elements, which, at least in part, end switching functions that were initiated by switching the switching elements by means of the start button.

The switching device can be used with an ignition-starter switch in a motor vehicle, for example. In this case, provision can be made for depression of the actuation surface 1 to switch the first switching element 5, which initiates checking of the authorization of the vehicle user, e.g. by means of biometric features such as a fingerprint. The actuation surface 1 can have a biometric sensor for checking authorization, for example.

Ignition of the motor vehicle is activated via the switching element 5 by pressing the actuation surface 1 down farther along the actuation path. If the actuation surface 1 is pressed beyond this position along the actuation path, the engine is started, provided that authorization for use of the vehicle has been established. The triggering of the ignition activation and engine start functions can be configured in such a way that they can be detected haptically by the vehicle user.

Provision can also be made for switching elements for operating an air-conditioning system and/or a window wash/wipe system in a motor vehicle, for example, to be embodied in accordance with the device of the invention.

However, the switching device can also be used with switching elements wherein there is the risk of damage to a switching element by mechanical overloading of the switching element.

The switching elements of the components of audio or video equipment or cameras may be mentioned as further examples.

We claim:

1. A switching device, comprising:
   an actuation surface disposed to perform a translational movement upon actuation;
   a force transmission element operatively connected with said actuation surface;
   a switching element operatively connected with said force transmission element, said switching element being switched by said force transmission element upon an actuation of said actuation surface, whereby switching functions are initiated or performed;
   a holding device wherein said force transmission element is disposed, said holding device having a mechanical guide for said force transmission element, said mechanical guide being configured such that a force transmission to said switching element via said force transmission element is at least partially deflected when a movement of said force transmission element changes from a first motion to a second motion in dependence on an actuation path traveled.

2. The device according to claim 1, wherein said mechanical guide is geometrically configured to ensure that the first motion is translational and the second motion is at least partially rotational.

3. The device according to claim 1, wherein said mechanical guide is geometrically configured to ensure that the first motion is at least partially rotational and the second motion is translational.

4. The device according to claim 1, wherein said actuation surface includes at least one connecting element.

5. The device according to claim 1, wherein said force transmission element includes a plurality of connecting elements for switching a plurality of switches simultaneously or in succession.

6. The device according to claim 5, wherein said force transmission element is a mechanical rocker lever.

7. The device according to claim 6, wherein said force transmission element is one of a plurality of force transmission elements and said holding device is one of a plurality of holding devices.

8. The device according to claim 7, wherein at least one of said switching elements includes a device for indicating a switching of said switching element to be detected haptically.

9. The device according to claim 8, which comprises a return device for returning said force transmission element to an initial position when said actuation surface is no longer being pressed.

10. The device according to claim 9, wherein said return device is a spring having one end connected to said actuation surface and another end connected to said force transmission element.

11. An ignition-starter switch for a motor vehicle, comprising:
    an actuation surface disposed to perform a translational movement upon actuation;
    a force transmission element operatively connected with said actuation surface;
    a switching element operatively connected with said force transmission element, said switching element being switched by said force transmission element upon an actuation of said actuation surface, whereby switching functions are initiated or performed;
    a holding device wherein said force transmission element is disposed, said holding device having a mechanical guide for said force transmission element, said mechanical guide being configured such that a force transmission to said switching element via said force transmission element is at least partially deflected when a movement of said force transmission element changes from a first motion to a second motion in dependence on an actuation path traveled.

* * * * *